United States Patent [19]

Knudsen

[11] 4,264,316

[45] Apr. 28, 1981

[54] PROCESS FOR CLOSING CONTAINERS AND FOIL MEMBRANE THEREFOR

[76] Inventor: David S. Knudsen, 3145 Hawthorne Blvd., St. Louis, Mo. 63104

[21] Appl. No.: 53,282

[22] Filed: Jun. 29, 1979

[51] Int. Cl.³ .......................... B31B 1/66; B31B 1/72
[52] U.S. Cl. .................................. 493/103; 493/135; 493/153; 156/69; 156/272; 219/10.43
[58] Field of Search .......... 93/55.1 P, 39.1 P, 39.1 R, 93/39 C, 39 R, 55.1 R, DIG. 1; 156/69, 272, 380; 219/10.43, 10.53, 10.69

[56] References Cited

U.S. PATENT DOCUMENTS

| | | | |
|---|---|---|---|
| 3,690,091 | 9/1972 | Christensson | 93/55.1 P X |
| 3,808,074 | 4/1974 | Smith et al. | 156/69 |
| 4,017,704 | 4/1977 | Collins et al. | 219/10.69 X |
| 4,095,390 | 6/1978 | Knudsen | 156/69 X |
| 4,144,433 | 3/1979 | Zelahy et al. | 219/10.53 X |

Primary Examiner—James F. Coan
Attorney, Agent, or Firm—Gravely, Lieder & Woodruff

[57] ABSTRACT

A container having a generally rectangular rim surrounding its opening is closed by a foil membrane that extends over the rim and is sealed to the rim by inductively heating it. The membrane does not correspond in configuration to the rim, but instead its side and end margins curve away from the sides and ends, respectively, of the container rim, so that the peripheral margin of the membrane is located closer to the container rim at the corners of the rim than at the sides or ends of the rim. The foil of the membrane is coated with a resin bonding material, and when the membrane is placed in a rapidly oscillating magnetic field, its foil is inductively heated throughout the entire area that overlies the rim, thereby rendering the bonding material plastic and establishing a uniform bond between the rim and membrane. In contrast, a membrane having the same generally rectangular configuration as the rim will bond to the sides and ends of the rim, but not to the corners without overheating the membrane, since a membrane of that configuration does not heat uniformly in an oscillating magnetic field.

14 Claims, 8 Drawing Figures

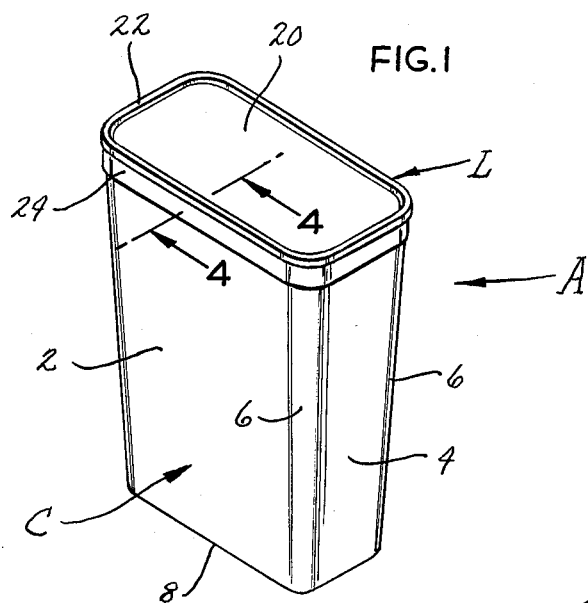
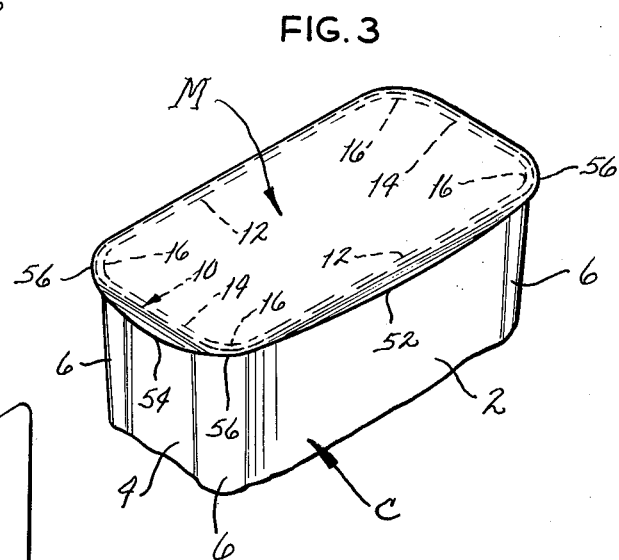
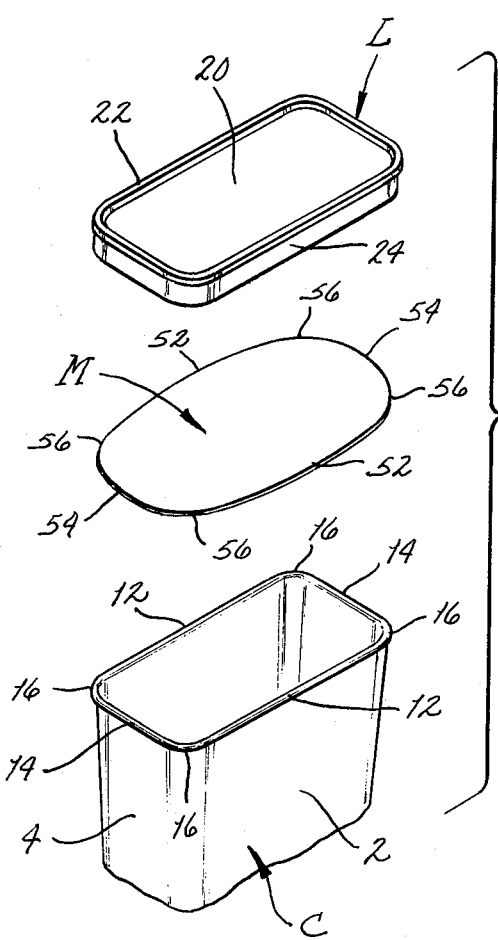
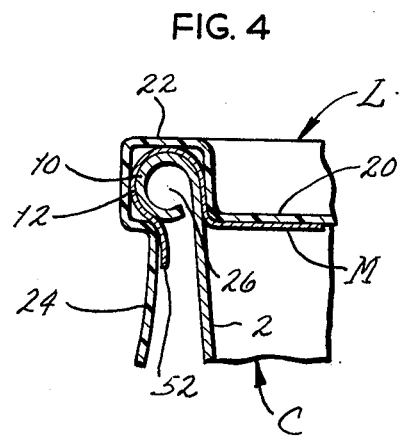

PROCESS FOR CLOSING CONTAINERS AND FOIL MEMBRANE THEREFOR

BACKGROUND OF THE INVENTION

This invention relates in general to closing containers having noncircular openings, and more particularly to the installation of inductively heated foil membranes over the openings of such containers and to a foil membrane suitable for that purpose.

One of the most economical packages for food products consists of nothing more than a paperboard container having an initially open end that is subsequently closed by a foil membrane. Normally a snap type lid fits over the membrane and interlocks with the container rim, thereby protecting the membrane. To render the paperboard impermeable to moisture, it is coated or impregnated with a resin. The foil of the membrane is likewise coated with a resin, and these resin coatings provide an ideal vehicle for securing the membrane, for when heated, the resins will become plastic and adhere the membrane to the container rim.

One method for heating the membrane involves nothing more than bringing a heated platen down against it and conducting heat from the platen into the foil of the membrane. This is a relatively slow procedure and involves handling the membrane separately from the lid that eventually fits over it. A far superior method is induction heating. To heat the membrane inductively, the membrane while on the container is subjected to a rapidly oscillating magnetic field which produces eddy currents within the foil of the membrane. These eddy currents in turn heat the foil sufficiently to melt the resin or at least render it plastic. Depending on the strength and frequency of the field, and the thickness of the foil, the temperature rise of the membrane occurs quite rapidly, and indeed almost instantaneously. Moreover, the lid, as long as it is formed from a dielectric substance, does not affect the field, and accordingly may be in place over the container as the foil membrane is heated. In other words, the membrane may first be installed in the lid, and the lid then applied to the container, in which case the lid serves as a convenient carrier and backing for the thin and highly flexible membrane.

A wide variety of erected paperboard containers is currently available to food processors, and many are capable of accommodating heat sealed foil membranes. However, not all membranes are suitable for inductive heating, at least in accordance with present technology. It appears that inductive heating lends itself best to circular membranes applied to circular container rims of corresponding diameter. In this case, the membrane heats evenly along its periphery, thereby providing a uniform seal with the circular rim of the container.

Rectangular containers, which pack more efficiently, are not so easily sealed, at least by inductively heating foil membranes. When membranes of a generally rectangular configuration are heated inductively, they experience a substantial rise in temperature along their sides and ends, but the rise is significantly less at their corners. It appears that the eddy currents induced by the rapidly fluctuating field concentrate along the straight margins and for some reason do not extend into or are cancelled out at the corners. Any heating which does occur at the corners seems to result by way of conduction from the areas adjacent to the straight margins. Consequently magnetic fields that are adequate for securing the side and end margins, do not secure corners. Elevating the intensity of the field to the extent the corners heat sufficiently to effect a seal, scorches the membranes along their side margins, and this is unacceptable.

Machines currently exist which enable food processors to erect containers at their food processing facilities from blanks supplied by container manufacturers. This affords significant economies since it eliminates the need for shipping erected containers, which occupy considerable space, yet weigh very little. Many of these machines erect containers of rectangular cross-sectional configuration, and to complement the packing and stacking efficiencies afforded by these containers, a need exists for inductively sealing foil membranes to such containers.

SUMMARY OF THE INVENTION

One of the principal objects of the present invention is to provide a foil type membrane which is capable of being inductively heated in a generally uniform manner so that it can be applied to and heat sealed against container rims of generally polygonal configuration. Another object is to provide a foil type membrane of the type stated that is ideally suited for closing container ends of generally rectangular configuration. An additional object is to provide a foil membrane of the type stated that may be heated and sealed by passing it at high speed through a rapidly oscillating magnetic field. A further object is to provide a membrane of the type stated which provides a generally uniform seal along the container rim without undergoing scorching or warping as the result of uneven heating. Still another object is to provide a process for sealing foil type membranes to container rims having polygonal configurations. These and other objects and advantages will become apparent hereinafter.

The present invention resides in a container having an opening surrounded by a generally polygonal rim and a foil membrane that covers the opening and is sealed to the rim along a continuous bond. The rim has margins that curve away from the sides of the polygonal rim. The invention also resides in the process for closing the container, and that process includes interposing a bonding material between the rim and the the foil of the membrane and inductively heating the foil sufficiently to render the bonding material plastic. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur;

FIG. 1 is a perspective view of a container sealed with a foil type membrane constructed in accordance with and embodying the present invention;

FIG. 2 is an exploded perspective view showing the container, the membrane, and the lid that fits over the membrane and engages the container;

FIG. 3 is a perspective view of the container showing the improved membrane attached to it;

FIG. 4 is a sectional view taken along line 4—4 of FIG. 1 and showing the lid fitted over the membrane and engaged with the container rim;

DETAILED DESCRIPTION

Figure 5:
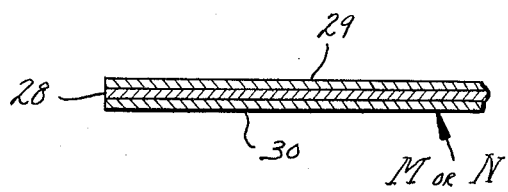
FIG. 5 is a sectional view of the foil membrane.

Referring now to the drawings (FIGS. 1 and 2), A designates a package consisting of a container C having an opening through which contents may be introduced into or removed from the container C. The opening possesses a generally rectangular configuration, and is closed by a foil membrane M and a lid L that fits over and protects the membrane M. Indeed, the lid L in effect snaps into engagement with the container C such that it is easily removed and replaced. The membrane M is heat sealed to the container C along the full rim that surrounds the opening so as to completely isolate the contents of the container C from the surrounding atmosphere. Moreover, the heat seal may be effected by inductively heating the foil of the membrane—an extremely fast and efficient sealing procedure. Due to its highly aseptic nature and the ease with which it is constructed and sealed, the package A is ideally suited for marketing food products, particularly from the shelves of supermarkets.

Figure 6:
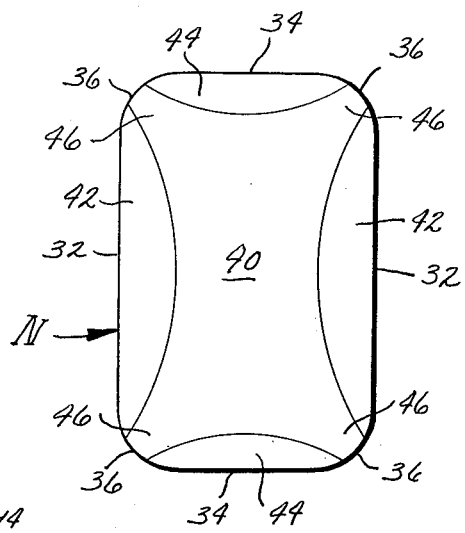
FIG. 6 is a plan view of a rectangular membrane that cannot be adequately heat sealed to the container by inductively heating it.

The container C, apart from the foil membrane M is old, and indeed attempts have been made to close the open ends of such containers with foil membranes N (FIG. 6) having substantially the same configuration as the open end. The attempts, at least when confined to inductive heating, proved to be wholly unsuccessful as will subsequently be described in greater detail.

The container C is preferably formed from an inexpensive sheet material that is bent into a four-sided configuration and provided a bottom. Paperboard coated or impregnated with a suitable resin such as polyethylene is one such material. Whatever the material, it should be a dielectric in the sense that eddy currents or magnetism will not develop in it when it is subjected to an oscillating magnetic field. The container C has (FIG. 2) spaced apart side walls 2 and spaced apart end walls 4, with the latter being joined to the former at curved corners 6. The side walls 2, the end walls 4, and the corners 6 are all preferably formed from a single paperboard blank which is folded into the four-sided configuration. One end of this configuration is closed by a bottom wall 8 which is secured to the side and end walls 4 and 6 and to the corners 6. At the opposite end, the side walls 2, the end walls 4, and the corners 6, are rolled outwardly and then somewhat underneath themselves to provide a continuous rim 10 that surrounds the initially open end of the container C. Being rolled, the rim 10 has a convex upwardly presented surface that lies in a single plane, and this surface may be divided into distinct segments, namely—sides 12 that are along the part of the rim 10 at the side walls 2, ends 14 that are along that part of the rim 10 that is at the end walls 4, and arcuate corners 16 that are along that portion of the rim 10 at the corners 6. The two sides 12 are parallel to each other, as are the two ends 14 and the latter are further oriented at 90° with respect to the former, thus imparting a rectangular configuration to the rim 10. Preferably, the resin coating for the paperboard is on its inwardly presented surface, that is the surface that is presented toward the interior of the container C, so that the resin also exists along the convex upwardly presented surface of the rim 10.

The lid L, is preferably formed from a relatively thin plastic material, which may be a sheet material that is deformed by the application of heat and pressure within a die to a configuration that enables it to snap over the rim 10 in the container C. Similarly, the lid L may be injection molded to the desired configuration. While plastics are ideal for the lid L, other substances are acceptable as long as those substances have the characteristics of a dielectric so that eddy currents will not be generated in them when they are subjected to the oscillating magnetic field.

Irrespective of the material or the manner in which it is converted into the desired configuration, the lid L has (FIGS. 1–3) a closure portion 20 that forms its major surface area and a ridge 22 that surrounds the closure portion 20, with the upper surface of the ridge 22 lying in a plane that is slightly above the plane of the closure portion 20. Depending from the ridge 22 is a skirt 24 which at its upper end is necked inwardly a very slight distance with respect to the outer margin of the ridge 22. Behind the ridge 22 is a groove 26 (FIG. 3) that opens downwardly and is configured to receive the rim 10 on the container C when the lid L is forced downwardly over the rim 10. Due to the configuration of the skirt 24, the groove 26 also extends outwardly beyond the skirt 24, and this portion of the groove 26 receives the outwardly directed portion of the container rim 10, thus insuring that the lid L grips the container rim 10 in a positive manner so as to not easily be dislodged. The skirt 24, flares outwardly from its necked portion 30 so as to possess a slight taper around the side walls 2, end walls 4, and corners 6 immediately below the rim 10. When the lid L is installed, the rim 10 is completely obscured. While the lid L closes the open end of the container C, it does not completely seal the container C. The foil membrane M serves this function.

Before considering the foil membrane M, a short discussion of the membrane N (FIG. 6) is in order, the membrane N, of course, representing unsuccessful attempts to seal the rectangular container C by induction heating. Like conventional circular membranes, the membrane N is die cut from thin sheet stock, and that sheet stock is preferably a laminate consisting of (FIG. 5) a very thin foil layer 28 which may be aluminum, a paper backing 29 on one side of the foil layer 28, and a resin coating 30 on the other side of the foil layer 28. The coating 30 should melt at between 150° F. and 400° F. and should further be compatible with the coating on the container rim 10 in the sense that the two resins will bond together. Polyethylene is a suitable resin. The laminated sheet stock is commercially available and is currently used for sealing food packages.

For all intents and purposes, the membrane N possesses precisely the same configuration as the rim 10, although it is large enough to be lapped over most of the convex upper surface on rim 10. As such, the membrane N has (FIG. 6) straight and parallel side margins 32, straight and parallel end margins 34, and arcuate corner margins 36 that join the side and end margins 32 and 34. The membrane N fits nicely into the lid L and this may be accomplished manually or automatically by a machine of the type described in U.S. patent application Ser. No. 963,011 of David S. Knudsen, filed Nov. 22, 1978, and entitled Machine for Installing Inserts in Container Lids. Irrespective of how the membrane N is installed, it should be deformed into the groove 26, in which case its margins 32, 34, and 36 will project outwardly beyond the skirt 24 so as to be retained in place. Then the lid L, with the membrane N within it, is placed over and engaged with the rim 10 of the container C. When the lid L is so installed, the side margins 32 of the membrane N lie along the sides 12 of the rim 10, the end margins 34 lie along the ends 14, and the curved margins 36 along the arcuate corners 16.

One would reason that the rectangular foil membrane N could be bonded to the container rim 10 merely by subjecting it to a rapidly oscillating magnetic field, just as circular membranes are bonded in the machine disclosed in U.S. Pat. No. 4,095,390. Such is not the case, for it appears impossible to heat the membrane N uniformly in such a field. More specifically, a magnetic field having sufficient intensity to bond a circular membrane of equivalent area, will only bond the membrane N to the rim 10 along the side margins 32 and perhaps along the end margins 34. Along the arcuate corner margins 36, the membrane N remains unbonded. It appears that the field for some reason is nullified or cancelled in the vicinity of the arcuate corner margins 36, this being apparent from the slight change of texture for the coating 30 on the foil layer 28 the membrane N as a result of the heating.

The coating 30 retains its original texture in an interior area 40 (FIG. 6) shaped much like an hourglass. To each side of the hourglass area 40 are areas 42 having greater sheen, indicating elevation to higher temperatures. Similarly at each end of the hourglass area 40 are additional arcuate areas 44 having greater sheen, indicating that these areas reached a temperature close to that of the areas 42. The line of demarcation between the area 40 of original texture and the areas 42 and 44 of altered texture constitutes an isotherm, that is a line of generally constant temperature. Actually, by reason of the arcuate inner boundaries for the areas 42 and 44, a temperature gradient appears to exist in those areas, with the greatest temperature for the areas 42 appearing to occur along the side margins 32 midway between the ends of those margins and likewise the greatest temperature for the areas 44 appearing to occur along the end margins 34 midway between their ends. The hourglass area 40 at its ends flares outwardly toward the arcuate corner margins 36, so that the membrane N has corner regions 46 that are of the original texture. These regions may extend all the way out to the arcuate corner margins 36 and under normal power settings do, thus indicating that the field is cancelled or is otherwise not effective at heating the membrane N in the regions 46. Indeed, any heating in the regions 46 appears to occur, not by reason of the induced eddy currents, but instead by conduction from the arcuate areas 42 and 44. Conduction, however, does not occur as rapidly as induction and indeed may not occur fast enough to achieve an adequate seal. Furthermore, heat is also conducted into the rim 10 of the container C so the regions 46 cannot be expected to reach a temperature even approaching that of the contiguous areas 42 and 44 solely by reason of conduction.

The intensity of the magnetic field may be elevated to the point where the membrane N bonds to the container rim 10 even along the arcuate corner margins 36, but at this intensity the temperature along the side margins 32 becomes so great that the paper backing 29 of the membrane N scorches and the underlying foil layer 28 tends to wrinkle. The scorching presents an unsightly appearance, as does the wrinkling, and furthermore the latter may prevent an effective seal from being produced along the side margin 32. Also even at an intensity high enough to produce scorching, the bond along the corner margins 36 does not have near the width of the bond along the side and end margins 32 and 34. In other words, even when the field intensity is great enough to provide a continuous bond to the container rim 10, that bond is far from being uniform.

The membrane M like the membrane N is die cut from a foil laminate sheet stock, and that laminate is the same as that used for the membrane N and conventional circular membranes. As such it includes the thin foil layer 28, the paper backing 29, and the resin coating 30. However, unlike the membrane N, the membrane M does not correspond in configuration to the rim 10 of the container C. On the contrary, it extends beyond the rim 10 in all regions except the arcuate corners 16 where its overlap is about the same as the membrane N. This difference in configuration enables the membrane M to heat generally uniformly throughout the area that is applied to the container rim 10 when the membrane M is subjected to a rapidly oscillating magnetic field.

Figure 7:
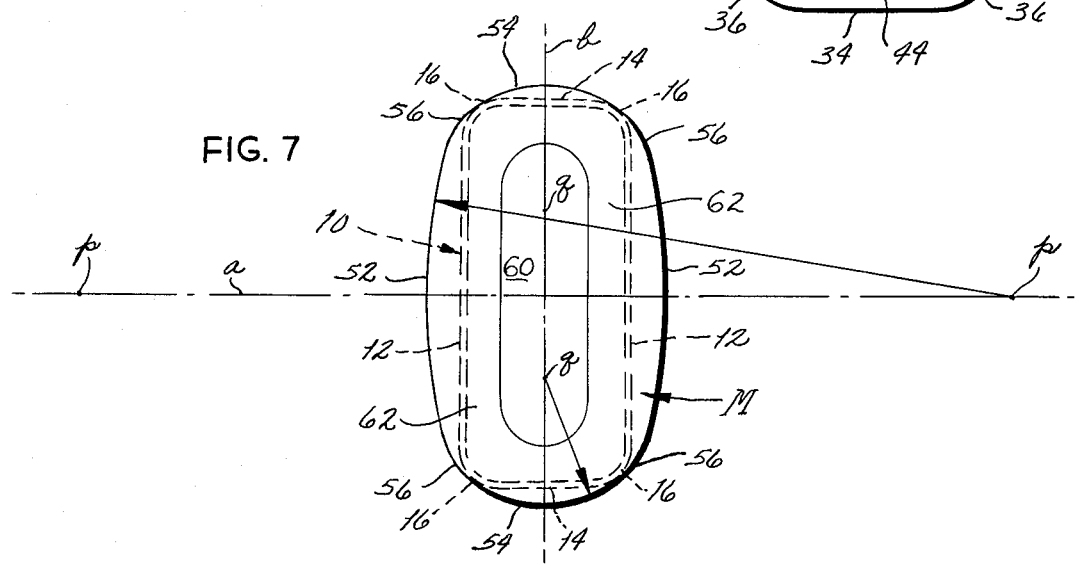
FIG. 7 is a plan view of the improved membrane with the rectangular container rim underlying it.

While the membrane N has straight and parallel side margins 32, and end margins 34, the membrane M has (FIG. 7) arcuate side margins 52 and arcuate end margins 54, all of which are convex so as to impart a somewhat oblong or oval configuration to membrane M. The side margins 52 are concentric about points p located along the transverse axis a of the membrane M, and are further of equal radius. The end margins 34, on the other hand, are concentric about points q located along the longitudinal axis b of the membrane M, and are likewise of equal radius, that radius being considerably smaller than the radius for the side margins 52. The side and end margins 52 and 54 do not merge abruptly, but instead merge along intervening corner margins 56. The width of the membrane M measured along its transverse axis a is somewhat greater than the width of the container rim 10 measured between the outer extremities of the two sides 12. Likewise, the length of the membrane M when measured along its longitudinal axis b is somewhat greater than the length of the container rim 10 measured between the outer extremities of the ends 14. Thus, when the membrane M is placed over the rim 10 of the container C and centered, the convex side margins 32 project beyond the sides 12 of the rim 10, while the convex end margins 54 project beyond the end sections 14 (FIGS. 3 and 7). Only in the region of the intermediate margins 56 does the membrane M register with the container rim 10. Actually, in use the membrane M is not in a planar condition, but instead the overlapping portions along the side and end margins 52 and 54 fold downwardly over the rim 10, and in the case of the portions at the side margins 52, along the side walls 2 of the container C also.

Subjecting the membrane M to a rapidly oscillating magnetic field produces a pattern in the texture of the coating 30, but that pattern is entirely different from the hourglass pattern 40 of the membrane N. In particular, a center area 60 (FIG. 7) of unaltered texture exists within a surrounding area 62 of altered texture. The line of demarcation between the two areas 60 and 62 is generally straight and parallel at its sides and curved at its ends. This line represents an isotherm, and that isotherm, when the membrane N is centered over the rim 10 is spaced generally equidistantly from the rim 10, even along the curved corner sections 6. This indicates that the area of the membrane M which is applied against the container rim 10 is at generally uniform temperature.

To seal the container C with the membrane M, the membrane M is first installed in the lid L in centered condition with the resin coating 30 being exposed. Moreover, the membrane M is deformed into the groove 26 of the lid L. The intermediate margins 56, being designed to register with the arcuate corners 16 of the container rim 10, fit into the groove 26. However, the arcuate side and end margins 52 and 54, being spaced further apart than the respective sides and ends 12 and 14 of the container rim 10, extend out of the groove and along the inside face of the skirt 24. The installation may be performed manually or automatically by the machine of U.S. patent application Ser. No. 963,011, previously referred to. Thereafter the lids L with the membranes M installed in them are fitted over the container rim 10, and this may likewise be a manual procedure, or it may be performed automatically by a machine such as the type described in U.S. patent application Ser. No. 869,262 of David S. Knudsen, filed Jan. 13, 1978, and entitled Machine for Gripping and Sizing Containers Formed from Flexible Material.

Once the lid L is installed, the membrane M within the lid L is subjected to an oscillating magnetic field of sufficient intensity to heat the foil layer above the melting temperature for the resin coating 30, at least in the region of the rim 10. At the same time a downwardly directed force is applied to the lid L so that the membrane M is compressed between the lid L and container rim 10. The coating 30, having been raised to its melting point, bonds to the rim 10 and seals any minute crevices that may exist between foil layer 28 and the rim 10. This compressive force remains after the field is removed and as the resin coating solidifies, thus insuring a secure and impermeable bond between the foil layer 28 and the container rim 10.

Figure 8:
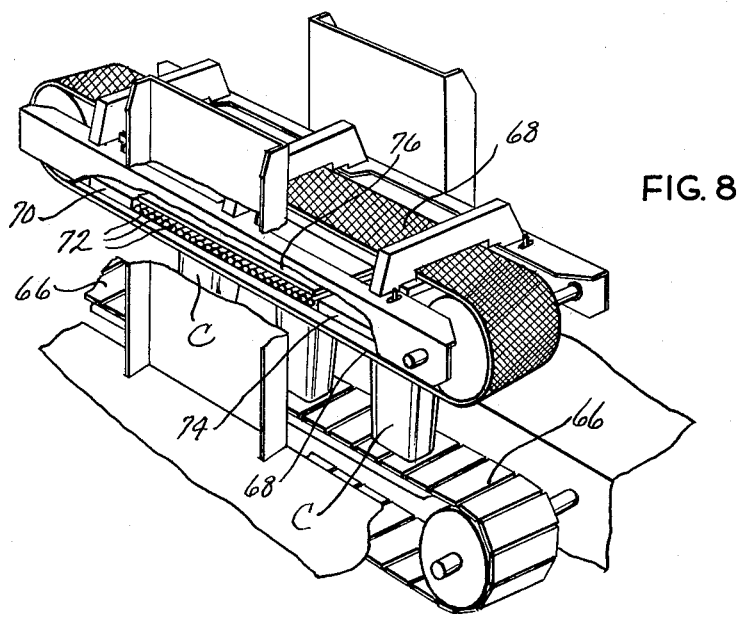
FIG. 8 is a perspective view of a machine suitable for heat sealing the membranes to the container rims.

While various devices exist for producing the magnetic field and providing the compressive force, perhaps the best is the machine of U.S. Pat. No. 4,095,390. In that machine (FIG. 8) the containers C travel on a feed conveyor 66 which carries them under an endless belt 68 moving at the same velocity. The belt 68 bears against the lids L of the containers C and is backed by a skid plate 70, a series of rollers 72, and another skid plate 74 in that order. Located immediately behind the rollers 72 is a coil 76 which produces a magnetic field that changes polarity at radio frequency. The coil 76 may be of the type disclosed in U.S. Pat. No. 4,017,704. As the containers C pass beneath the coil 76, the rollers 72, acting through the belt 68, apply an undulating force to the lids L and to the membranes M within the lids L. It is during this time that the foil layer 28 is heated, so that the undulating force serves to work the plastic coating 30 down against the rim 70 and create good contact between the foil layer 28 and rim 10. The second skid plate 74 applies a uniform force to the lids L as the membranes cool and the coatings 30 on them solidify.

Since the coil 76 heats the membrane M generally uniformly in the peripheral region that is against the container rim 10, the bond between the membrane M and container rim 10 is of a generally uniform character. This affords considerable latitude as to the intensity of the field, so that the desired bond can be achieved without fear of scorching in one region or perhaps acquiring an incomplete bond in another, as is true in the case of the membrane N.

The portions of the membrane M which overlap the side sections 12 of the rim 10 and remain detached from the rim along the arcuate side margins serve as convenient pull tabs for removing the membrane M when one desires to gain access to the contents of the container C (FIG. 3).

While the lids L serve as a holder for the membrane M and in that sense rigidify it, the lid L is not absolutely essential and the membrane M may be installed without the lid L. Also the container C need not be paperboard, but may be made from other dielectric materials such as plastic or glass. Furthermore, the principles described herein are equally applicable to membranes and rims of other polygonal configurations and near polygonal shapes.

This invention is intended to cover all changes and modifications of the example of the invention herein chosen for purposes of the disclosure which do not constitute departures from the spirit and scope of the invention.

What is claimed is:

1. A process for closing a container opening that is surrounded by a rim of generally polygonal configuration, said process comprising: placing a metal foil over the polygonal rim of the opening; the foil having a peripheral margin that is further from the rim of the polygonal opening than the corners of the opening; interposing a bonding material between the metal foil and the rim of the container opening; and, while the foil is over the opening and the bonding material is between the foil and the rim; subjecting the foil to a rapidly oscillating magnetic field and at the same time producing relative physical movement between the field and the foil, the field being of sufficient intensity to inductively heat the foil enough to render the bonding material plastic, whereby the foil bonds to the rim.

2. A process according to claim 1 wherein the peripheral margin of the foil outwardly from the sides of the rim for the opening is curved and generally convex in configuration.

3. The process according to claim 2 wherein the bonding material is on the foil when the foil is placed over the rim of the opening.

4. The process according to claim 1 wherein the container rim and foil membrane move through the magnetic field when the foil is subjected to the magnetic field.

5. The process according to claim 1 and further comprising placing a dielectric lid over the foil before the foil is inductively heated, the lid having greater rigidity than the foil.

6. The process according to claim 5 and further comprising compressing the foil between the lid and the container rim as the foil is heated inductively and thereafter while the bonding material cools.

7. The process according to claim 6 wherein the lid has a groove corresponding in shape to the rim of the container; and wherein the foil is deformed into the groove.

8. A process for closing a container having an opening surrounded by a rim of generally polygonal configuration, said process comprising: placing a metal foil over the opening, the foil having peripheral margins that correspond to the sides of the polygonal rim, but curve outwardly away from the sides of the rim in a generally convex configuration, interposing a thin layer of bonding material between the foil and the rim of the container with the bonding material having a melting temperature below that of the foil and rim; and, while the foil is over the rim of the container with bonding material interposed between it and the rim, inductively heating the foil sufficiently to render the bonding material plastic, whereby the foil bonds to the rim.

9. The process according to claim 8 wherein the foil is inductively heated by passing the foil through a rapidly oscillating magnetic field so that the foil and the rim of the container move relative to the field.

10. The process according to claim 8 wherein the peripheral margin of the foil is located closer to corners of the rim than to the sides of the rim.

11. The process according to claim 10 wherein the peripheral margin of the foil is curved in the region of the corners for the rim.

12. The process according to claim 11 wherein the corners of the rim are curved.

13. The process according to claim 10 and further comprising placing a dielectric lid over the foil before the foil is inductively heated, the lid having greater rigidity than the foil.

14. The process according to claim 13 and further comprising compressing the foil between the lid and the container rim as the foil is heated inductively and thereafter while the bonding material cools.

* * * * *